(12) United States Patent
Shuster (10) Patent No.: US 8,726,355 B2
(45) Date of Patent: May 13, 2014

(54) IDENTITY VERIFICATION VIA SELECTION OF SENSIBLE OUTPUT FROM RECORDED DIGITAL DATA

(76) Inventor: Gary Stephen Shuster, Fresno, CA (US)

( * ) Notice: Subject to any disclaimer, the term of this patent is extended or adjusted under 35 U.S.C. 154(b) by 783 days.

(21) Appl. No.: 12/490,793

(22) Filed: Jun. 24, 2009

(65) Prior Publication Data

US 2009/0328175 A1    Dec. 31, 2009

Related U.S. Application Data

(60) Provisional application No. 61/075,150, filed on Jun. 24, 2008.

(51) Int. Cl.
| | | |
|---|---|---|
| *G06F 7/04* | (2006.01) | |
| *G06F 12/14* | (2006.01) | |
| *G06F 21/00* | (2013.01) | |
| *H04L 9/32* | (2006.01) | |
| *H04L 29/06* | (2006.01) | |
| *G06F 21/31* | (2013.01) | |

(52) U.S. Cl.
CPC ............ *H04L 63/08* (2013.01); *H04L 63/1416* (2013.01); *H04L 63/0861* (2013.01); *H04L 9/3226* (2013.01); *G06F 21/31* (2013.01)
USPC ...... 726/5; 726/7; 726/22; 713/168; 713/170; 713/182

(58) Field of Classification Search
CPC . H04L 63/08; H04L 63/1416; H04L 63/0861; H04L 9/3226; G06F 21/31
USPC ...................... 726/7, 5, 22; 713/168, 170, 182
See application file for complete search history.

(56) References Cited

U.S. PATENT DOCUMENTS

| | | |
|---|---|---|
| 7,174,462 B2 | 2/2007 | Pering et al. |
| 7,219,368 B2 | 5/2007 | Juels et al. |
| 7,266,693 B1 | 9/2007 | Potter et al. |
| 2003/0093699 A1 | 5/2003 | Banning et al. |
| 2004/0030934 A1 | 2/2004 | Mizoguchi et al. |
| 2004/0093527 A1 | 5/2004 | Pering et al. |
| 2004/0119746 A1 | 6/2004 | Mizrah |
| 2004/0230843 A1 | 11/2004 | Jansen |
| 2005/0216955 A1* | 9/2005 | Wilkins et al. ................ 726/23 |
| 2006/0206717 A1 | 9/2006 | Holt et al. |
| 2006/0225127 A1 | 10/2006 | Roberts et al. |
| 2007/0002339 A1* | 1/2007 | Megawa et al. ............... 358/1.2 |
| 2007/0266428 A1 | 11/2007 | Downes et al. |

(Continued)

*Primary Examiner* — Aravind Moorthy
(74) *Attorney, Agent, or Firm* — Novak Druce Connolly Bove + Quigg LLP; Jonathan Jaech (57) ABSTRACT

A digital data sampler operating in a computer processor selects and stores digital data samples from a data stream used for generating audio-visual output during a session with a client operated by a user. The session generates the data stream independently of the data sampler. The data sampler may collect parameter data correlated to a probability will be remembered by the user at some future time, for each sample. The data sampler may store the data samples and parameter data as shared secret data for use in a future authentication session. During a future authentication session, an authentication device selects test data from the shared secret data to generate sensible output in an authentication process. The authentication process grants access to a controlled resource in response to user input indicating specific knowledge of the shared secret data selected from a presentation of similar sensible outputs.

24 Claims, 3 Drawing Sheets

(56) References Cited

U.S. PATENT DOCUMENTS

| | | |
|---|---|---|
| 2007/0277224 A1 | 11/2007 | Osborn et al. |
| 2007/0277235 A1 | 11/2007 | Barrett et al. |
| 2008/0031493 A1 * | 2/2008 | Brogren et al. ............... 382/103 |
| 2008/0148366 A1 | 6/2008 | Wahl |
| 2008/0244700 A1 * | 10/2008 | Osborn et al. .................... 726/2 |
| 2009/0064321 A1 * | 3/2009 | Dick et al. ....................... 726/21 |
| 2009/0070881 A1 * | 3/2009 | Yellepeddy et al. ............ 726/26 |

\* cited by examiner

IDENTITY VERIFICATION VIA SELECTION OF SENSIBLE OUTPUT FROM RECORDED DIGITAL DATA

CROSS-REFERENCE TO RELATED APPLICATION

This application claims priority pursuant to 35 U.S.C. §119(e) to U.S. provisional application Ser. No. 61/075,150, filed Jun. 24, 2008, which is hereby incorporated by reference, in its entirety.

BACKGROUND

1. Field

The present disclosure relates to authentication of users in a secure network, and more particularly to knowledge-based identification using image selection in which images are selected from past user sessions.

2. Description of Related Art

Many commercial and other transactions require verifying the identity of one or more persons making the transaction. When such transactions are performed on-line, using a communications network together with a computer or other communications device to communicate with a remotely located person, identity verification may be even especially critical to completing a successful and secure transaction. When transacting with a remotely located person, Identity verification is often performed using confidential and secure passwords, account numbers, and the like, belonging to the person whose identity is being verified. One drawback of this approach is that it requires sharing confidential information at some point during the verification process. This may be unacceptable or uncomfortable in some circumstances, because the person whose identity is being verified may not trust that the entity receiving the confidential identity information will properly safeguard and use it. More fundamentally, passwords, confidential identification numbers, account numbers, and similar information are generally susceptible to discovery by other parties, leading to the problem of identity theft. Theft is also a problem with physical security tokens. Biometric-based identity methods may avoid these drawbacks in some circumstances, but are not easily implemented in other circumstances. For example, biometric identification is not currently feasible in many remote, on-line transactions. Also, some forms of biometric identification, for example photo ID cards, may be inherently unreliable or subject to attack using counterfeit models or images expressing replicated biometric data.

Knowledge-based systems for identity verification, including remote verification, are capable of user authentication that takes advantage of human visual processing and memory. Some such systems present a sequence or matrix of images to a user during an authentication process. The process authenticates an inquiry in response to the a correct selection of images that are known to the user from the sequence or matrix consisting of both known and unknown images. A problem with image-based knowledge systems is the difficulty in establishing numerous "known" images between the authentication system and the user as shared secret information useful for authentication. It would be desirable, therefore, to provide an improved method and system for generating shared secret images for use in knowledge-based authentication using image recognition.

SUMMARY

The present technology provides an improved method and system for generating shared secret images for use in knowledge-based authentication using image recognition. The technology utilizes the fact that each user's experience with an interactive computing environment will, over time, be unique to that individual user, or can be designed so, in that it can be experienced only by that user. Therefore, only the user that experienced a particular sequence of interactive viewing (or other experiencing) of computer output will retain a memory of that sequence and events occurring therein. Furthermore, most people are capable of very robust visual memory feats in response to visual or other sensory triggers. For example, when presented with a distinct visual image, most people will correctly remember whether or not they have experienced the image before while interacting with a computer. A selected portion of such sensory experience, therefore, may be sampled and retained for use in identity verification. The user that experienced recorded sensory input will have a high probability of correctly recalling that experience, so long as it is fairly recent or otherwise memorable, while the probability of anyone else correctly guessing what that user experienced can be designed, using the correct test methodology, to be extremely low. The present technology exploits these characteristics of human memory and behavior for use in identity verification.

For example, in a virtual world environment (or other environments where a service provider has access to video, audio or other real world data about the user), it is possible to implement an anti-phishing mechanism that functions by asking the user to verify that he was present at a particular moment. For example, imagine a Second Life™ or other online game user who is about to complete a transaction. A verification system may transmit four sets of three Second Life™ scenes to a client operated by the user. One scene in each set is a screen capture from a moment that the user was present for (and/or present in) within Second Life. The other two are fabricated scenes (or captures of scenes in which the user was not present). Optionally the user's avatar may be removed from all scenes (and optionally replaced with a shadow or unidentifiable avatar). If the user identifies which scenes he was present for, he has verified that he is the one who has operated the account at those times. The difficulty of "guessing" the right answer can be adjusted by adjusting the number of challenge tests, the number of scenes in each test, etc.

This method can also be used to verify, for example, the identity of an audio or video telecommunications user, for example a user of the system currently known as video Skype. The present system may provide the user with the inbound (or outbound) video screen grabs for calls he was—and calls he wasn't—present for. By identifying the real calls, the user can verify his presence.

In some embodiments, a computer system operating verified user accounts and handling image data in connection with those accounts has access to video or still image data that is presented to respective clients during transactions involving verified users. For example, a computer system operating a video conference between accounts "A" and "B" has access to the image or video data presented to user "A". For further example, a computer system providing a game to user "A" has access to screenshots of the game played by user "A." The computer system periodically or at random intervals, or in response to some predetermined system event or events, selects and stores video clips or screenshots of video/image data presented to users, and stores the video image data, identified by a user ID. Subsequently, the computer system provides stored clips or still images for verifying the identity of the computer systems' verified account holders, e.g., user "A". These stored images are then randomly placed by a authentication application operating on an access control device with a selection of control images. The access control device instructs the individual to be verified to select the images that were actually presented to him/her from all presented images. Identity is considered verified and access is provided if the system receives a response indicating a correct selection of the presented images.

The technology is characterized by the image or auditory data being sampled from prior digital data sessions conducted primarily for some other purpose than image recognition training. For example, the primary purpose of the digital data session may be game play, telecommunications, viewing prerecorded content, viewing live recorded content, online shopping, online social networking, online dating, or other online service of interest to the user. The digital data session is conducted in a secure environment controlled such that only the person or persons to be authenticated have access to sensible (e.g., visible or audible) output from the data session. The digital data session generates sensible output from a stream or digital data of that may be sampled at intervals, at times, or in response to events. The sampled data is of a nature to permit later regeneration of the sensible output, in a modified or unmodified form, during a subsequent authentication session. The data may be sampled to populate a shared secrets data base or other data structure for each respective account, according to an algorithm designed to select and store digital data for sensible output that is most likely to be recognized in the future by the user as having been previously experienced. The digital data for generating these outputs may be stored in a data repository of shared secret sensible outputs at the system level, which may include a set of such outputs unique to each system subscriber.

Each sample may be characterized by parameters used to rank and select the images for use in authentication. Such parameters may include, for example, duration for which an image was displayed, quantity of user input received while during image display or during audio output, quality or type of user input received during image display or during audio output, and time elapsed since image was displayed or audio was output. Such parameters may provide a useful indication of likelihood that the end user will successfully recall the image or audio output during authentication testing. For example, successful recall may correlate positively to duration of user exposure and inversely to time elapsed since last exposure. Selection of the image or audible data for use in later authentication may use such parameters to select images or audio outputs that are more likely to be recalled at the time of authentication. Selection of images or audio outputs used for authentication testing may therefore change as a function of time, as newer images and audio outputs are added to the database of shared secret sensible outputs.

What results is a fluid database of shared secret outputs that can be used in authentication testing for access control to any resource, including but not limited to the resource from which the underlying database was derived. This provides significant benefits in that all the usual benefits of knowledge-based authentication can be realized without any additional time spend training the end user. From the user perspective, training is entirely incidental to the use of the resource, and requires no additional time or effort. Furthermore, the shared secret database derived during use of one resource can be used to control access to any other resource capable of being electronically locked using a device with timely access to the shared secret database. There is no reason, for example, that a locking device on a home or vehicle that incorporates a display screen and keypad could not be coupled to a shared secret database generated from an individual's use of cloud computing resources delivered via a secure mobile device.

A more complete understanding of systems and methods for generating, maintaining and using shared secret data in knowledge-based authentication using sensible output recognition will be afforded to those skilled in the art, as well as a realization of additional advantages and objects thereof, by a consideration of the following detailed description. Reference will be made to the appended sheets of drawings which will first be described briefly.

DETAILED DESCRIPTION

Figure 1:
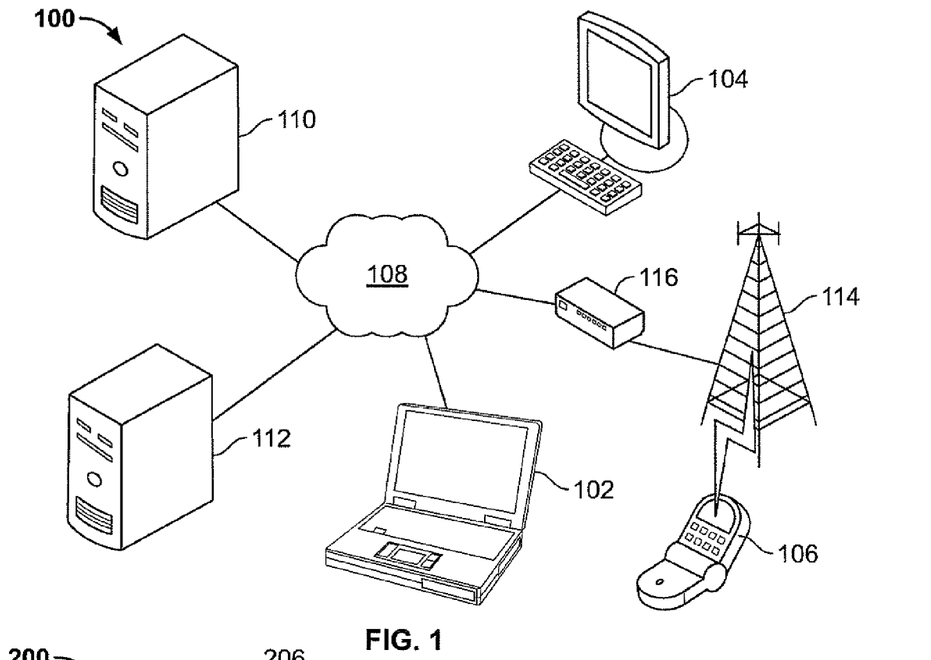
FIG. 1 is a system diagram showing an example of a networked computer system in which generating, maintaining and using shared secret data in knowledge-based authentication may be implemented.

The method or system may be implemented in a networked computing environment 100, as shown in FIG. 1. An exemplary networked environment may comprise, for example, a plurality of clients 102, 104, 106 (three of many shown) in communication via wide area network components, for example, Internet 108 with at least one verifying server 110 and a content server 112. The system may also include any number of servers (not shown) in need of client authentication for transaction requests or any other purpose. Each client 102, 104, 106 may comprise a processor, a input device, for example, a keyboard, pointing device, touchscreen, or microphone configured to receive input from a human user and to translate the input into usable signals for the processor, and an output device, for example a display screen, speaker, or both to provide human-perceptible output in response to processor control. Client 106 exemplifies a wireless handset client in communication with other system elements via a cellular network 114 and router/interface 116. The verification server 110 may operate one or more applications to perform identity verification and data output as described herein. The applications may be encoded on a computer-readable media (not shown) operably associated with the server 110.

Likewise, one or more content servers 112 may be configured to provide visual content, for example, movie or television content, on-line game content, or other visual content, to any of the plurality of clients 102, 104, 106. For example, content server 112 may comprise a virtual reality video game or social networking server configured to serve game or environmental scene data in response to client input. For further example, content server 112 may comprise a server providing streaming video content. In general, content server 112 may include any server configured to provide specified electronic data for generating a determinate, reproducible visual display on a client display device, for example a video monitor or display screen. The electronic data should be provided in response to client requests associated with a specified account identifier, for example, a user ID. Therefore, the electronic data is capable of being captured and stored in association with an account identifier, time and date. For example, using inputs to and outputs from the content server 112, data for generating a single static screen, a single frame of video data, or a subset of frames making up a portion of a video clip may be sampled, stored, and associated with a user ID, timestamp, and date stamp by content server 112 or by an intermediate server or process (not shown) relaying content to the targeted client. Content server 112 or an intermediate between the server 112 and a destination client may include one or more applications for performing the sampling and related functions. The applications may be encoded on a computer-readable media (not shown) operably associated with the server 112 or other device.

Environment 100 may further include other servers, including but not limited to other content servers, merchant servers, and search engine servers (not shown), which may cooperate with the verification server 110 to receive input from the client, develop data samples for use in authentication, and output samples and other data to clients 102, 104, 106 as part of an authentication service. Various arrangements and uses of such services will become apparent to one of ordinary skill in view of the present disclosure. Merchant servers in particular or other verification clients may operate as clients of a verification service offered by verification server 110. For example, in a transaction between a merchant server and any one of clients 102, 104, 106, the merchant server may communicate with the verification server 110 to verify a user identification presented by the client. Thus, the verification server should be configured for communication with one or more content servers and one or more merchant servers. In the alternative, or in addition, the verification server may be integrated with the content server, merchant server, or with both. Communication between various functions and nodes may occur via a wide area network 207 or other communication link.

Figure 2:
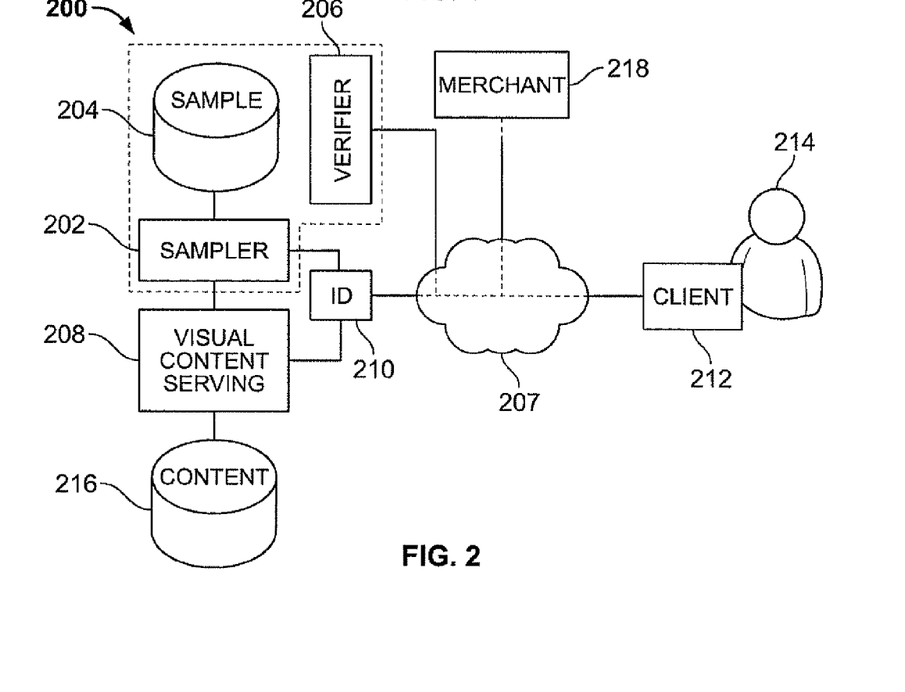
FIG. 2 is a block diagram showing another example of a system implementing software and hardware for generating, maintaining and using shared secret data in knowledge-based authentication.

The block diagram shown in FIG. 2 exemplifies dual processing functions such as may be performed using a verification server. System functions are shown as functional black boxes that may be implemented using any suitable hardware, firmware, and/or software, or combination thereof, implemented in one or more separate machines. Core functions 200 of an exemplary verification service may include visual data sampling function 202, a visual sample database 204 and an identification verifying service 206. The sampling function may be operatively linked with a visual content service 208, for example, a content server as described above. A user identification function 210 may operate in cooperation with the content service 208 to assign a user ID to each client session for receiving visual content initiated with the content service 208 by client 212.

Verification of the user identity for purposes of a subscriber 214 to the content service 208 may by any suitable method, including but not limited to the methods described herein. For example, individual users may often find it convenient to subscribe to one or more content-providing services. Such services may require periodic payment via a credit card or similar financial instrument. Verification of user identity may therefore be performed by one or more of such content providers prior to initiation of a sampled visual content session, as necessary for establishing each user subscription. In addition, the content provider may protect and verify user identity using passwords, pass codes, account identifiers, or the like.

Accordingly, each visual content session operated by the content service 208 to be sampled by sampler 202 should be conducted with a single identified user. The content provider may therefore query the client 212 seeking confirmation of the user identity prior to initiating a visual session that will be sampled. In addition, the verification methods presented herein may be useful for detecting account sharing by more than one individual user. As will be evident from the disclosure below, an account holder who has loaned his account identifier and pass code to one or more other users will generally have a high risk of failing a verification test based on the content provider's visual data provided to his account. This aspect of the verification method may be used to discourage account sharing, if desired.

After establishing a session with an identified user, visual content service 208 supplies digital data from which a particular visual rendering can be determined in a reproducible manner to client 212. Such digital data may include, for example, web pages, image files, video files, and input for a visual rendering engine, whether in public or proprietary formats. When output on a client display after appropriate client-side processing, the data causes a static or video display. Therefore, the data may be sampled to extract portions of the digital data suitable for reproducing a static screenshot or moving video time slice at a particular instant or period of time. Content service 208 may retrieve stored digital data from a content database 216 and serve it to the client 212, in response to client input. In the alternative, or in addition, the content service may generate the digital visual data using an image generating application. For example, a game content server may pull some visual elements from a database, place the elements in a view using a game algorithm, and generate other visual elements numerically. Any suitable process may be used to provide the digital visual data to the client 212. The process should be configured such that user 214 is presented with views of a coherent image, while some portion of these views, for example, selected screenshots, are sampled and retained for later use in identity verification, without disrupting the visual data process. Examples of content servers may include web servers for all manner of content, video game servers, and video content servers, for example, movie and television servers.

Sampling may be performed by the sampling function 202. Sampling may be done at random, or at periodic intervals. However, if may be preferable to use a more intelligent sampling methodology to enhance the safety and usability of collected data. Generally, sampled visual data should have all of the following characteristics, if possible: (1) the image or other sensory output reproducible from the sampled digital data should be of a distinctive, easily remembered nature; (2) the sampled data should not include any information of a confidential or overly revealing nature; (3) the user for whom the data is sampled should actually have experienced the sensory output from that data, and more preferably, actually have had a mental focus on the output while experiencing it; and (4) the sample should not be too old when it is used for verification. To increase the likelihood of obtaining these sample qualities, sampler 202 may be configured to operate cooperatively with content function 208 to perform optimal sampling. Either the sampler or the content function may use parameter data to detect or identify the likelihood that particular content is likely to be viewed and remembered by the user. For example, the content function may designate certain digital data as "high focus" if the output required by the data requires user input before changing or if user input (via client 212) is actually received while the data is being output to the user. The content server may independently designate some data as "sensitive" or "confidential," and access to such data by the sampler 202 may be forbidden. Similarly, the content server may designate content to be "distinctive" and suitable for sampling. In addition, or in the alternative, the sampler 202 may analyze data using spectral analysis or other analytical tools to identify images or other analog output generated from the data as more or less likely to be visually distinctive. Various other filters may be applied to identify suitable data for sampling, and data may be selected from the filtered suitable data in a random or quasi random fashion. In the alternative, or in addition, images or other sensory output may be passed to a human operator for confirmation as to whether the sampled data appears suitable for use in identity verification. A human operator or intelligent computing process may apply tests as described above and destroy samples that are not suitable, for example images that include confidential or offensive subject matter, or that are not visually distinctive.

Yet another option is to provide data to client 212 for presenting images or other sensory output to user 214, together with an explanation that the output is to be used for identity verification at a later time. The user may then inspect or otherwise experience the output and provide feedback that the sensory output has been experienced. In the alternative, the user may be provided an option to select one or more images or other data to be used for future identity verification, such as from a selection menu or other interface. In general, alerting the user to the collection of a sample for verification, permitting user selection of samples, or similar methods, may greatly increase the probability that the data will later be remembered during identity testing. Care should be taken, however, that the user not be permitted to only designate sample data that others may easily infer were selected by that user, such as, for example, photographs of family members. While such samples may be useful, if used to the exclusion of more randomly selected data, robustness of the verification process may be diminished.

Sampler 202 may time stamp and date stamp digital data samples that pass suitability testing. Each sample may also be tagged with a unique identifier for the user that initiated that interactive session from which the sample was drawn. It should be apparent that "time stamp," "date stamp," and "tagging" in this context refer to electronic data transformations carried out by a computer. For example, a time and date may be read from a system clock when sample data is collected, to obtain a numerical value indicating a time and/or date, and the value included in a sample file containing, or pointing to, the sampled data, so as to be uniquely associated with a particular set of sample data. Similarly, for example, a user identification code may be included in the sample file. For further example, samples, time stamps, date stamps, user identifiers and any other metadata of interest may be uniquely associated in a relational database structure. Any suitable method of time or date stamping, and recording a user ID for the sample, may be used. Sample data and metadata relating to it may be stored in any suitable computer memory, database, or storage medium 204.

Periodically, a data maintenance function may review sample data stored in memory 204 to identify and optionally, remove, data that is deemed to old for use in identity verification. Useful sample age may very with the nature of the data sample. For example, a sample screenshot of a random webpage visited by the user may have a useful life of anywhere from an hour to 3 or 4 weeks, while a family photograph selected by the user may be deemed to have an indefinitely long useful life, although it may be more easily guessed by others. A maintenance function may request collection of more recent sample data as more short-lived samples age. It may be desirable for the sample database to contain numerous samples having various useful lives (designated periods of use) for each user.

At various times after collection of sufficient sample data relating to a particular user 214, the user may desire to remotely verify her identity to another remote party, for example, merchant server 218. It should be noted that identity verification is not limited to merchant servers, and may include other clients wishing to verify or confirm a user's identity, for any reason. As part of its own verification process, server 218 may communicate with verification function 206 to obtain sample verification data corresponding to the user to be verified. In response to a request from the server 218, the verification function may obtain data samples for the identified user from memory 204, together with randomly selected images that are not in any way associated with the identified user. These non-user samples may be used as decoys in identity verification testing, also called authentication. If sufficient user samples are not available, a failure message may be provided to server 218. Otherwise, the user samples and decoy samples may be passed to the server 218 together with information for using the samples in identity verification. However, in many implementations, it may be advantageous for the verifier 206 to also formulate the specific identity test and implement the testing process directly with client 212, using a secure and/or separate communication channel with the client. This prevents any third-party node, such as server 218, from possessing any information concerning correct answers to security questions that might compromise the verification process. On the other hand, to the extent that the sample comprises short-lived samples, or consists only of short-lived samples, relatively little security may be compromised by sharing correct answer information with a third-party server. In fact, one of the important benefits of the present technology may arise from use of a transitory sample set of verification data that is frequently updated.

Figure 3:
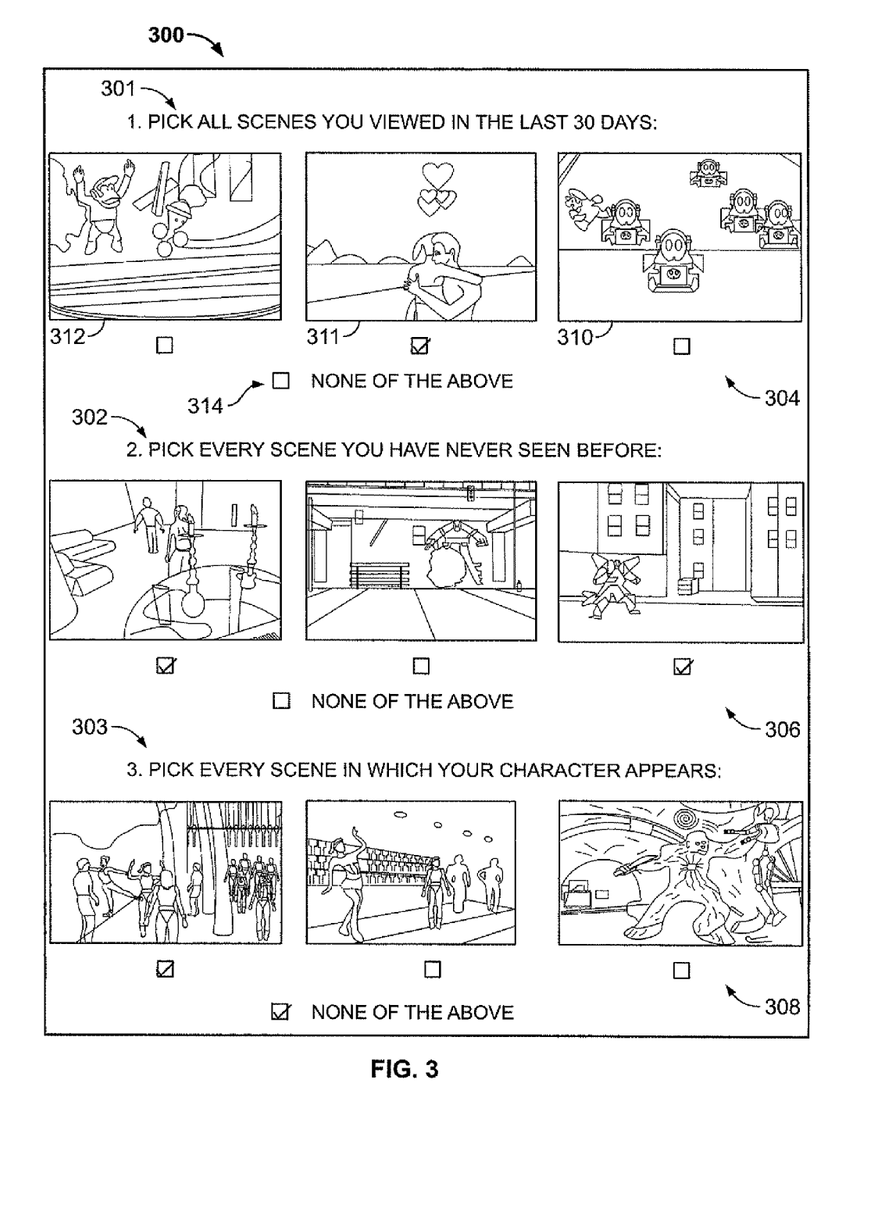
FIG. 3 is an example of a screenshot during an authentication process using shared secret data that are generated and maintained using the novel methods and machines disclosed herein.

FIG. 3 represents a screenshot 300 exemplifying an identity verification test page such as, for example, may be served by the verifier 206 to client 212. The test page may be transmitted as digital data (for example, and HTML or XML page) to a client operated by the user whose identity is to be verified. The client may receive the test and transform the digital data to a display or other output for use by the user, using conventional methods. It should be understood that the illustrated test is somewhat simpler than may be ideal in practice. Only three questions are presented, each with eight possible unique answers (any one of three images, any two, all three, or none), or 512 answer combinations. Therefore random answers have a 1 in 512 chance of being correct, which may be too high for a robust test. In practice, more questions and more answers to each question may greatly reduce the chances of a randomly correct answer. For example, increasing the number of images in each question to four increases the possible unique answers to 16, so a test of five such questions has 1,048,576 ($16^5$) answer combinations. The number and type of questions presented may be balanced with the desired level of security to optimize test length and type.

The verification page 300 may include different questions 301, 302, 303, each asking the user to select one or more correct response from the presented answer possibilities 304, 306, 308. Each of the answers may include plural thumbnail images, e.g., images 310, 311, 312, generated from sample data and arranged in a challenge matrix. Optionally, each thumbnail image may operate as a hyperlink to a full-size image version, to a video clip portion of a video sequence from which the image was extracted, to an audio clip associated with the image, or other mnemonic data. The user may select one or more answer to each question, for example, by using the interactive check boxes 314. User feedback may thus be collected by verifier 206 and scored against time/date/user ID metadata from memory 204. If all answers are correct, the user identity may be deemed confirmed by the verification server and a confirmatory message may be transmitted from the verification server to the inquiring server 214. If most but not all answers are correct as determined by the verifier function, additional testing may be performed by the verification server in case of inadvertent error or faulty memory. If an acceptably high rate of correct answers is not ultimately received from the client within a short period of time, testing may be terminated and a failure message transmitted to server 218.

Figure 4:
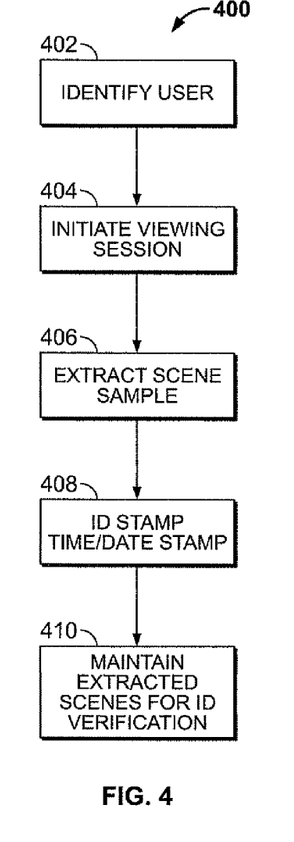
FIG. 4 is a flow chart showing elements of a sampling method for generating shared secret data during an unrelated digital data output process.

FIG. 4 shows exemplary steps of a method 400 for operating a sampling function for extracting digital data user for generating a user experience. Method 400 may be performed as a module or application operating on, or in cooperation with, a content server. User identification may be performed 402 by the content server in response to a client request for access to content, prior to initializing a session 404 in which data for providing visual or other sensory output is transmitted to the client. For example, client account and pass code data obtained in secure encrypted login process may be used to by the content server to find an associated unique user identifier. The user identity may be verified using a verification method as disclosed herein. In the alternative, the content server may query the client asking for confirmatory input from the user, confirming that the identified person is the person currently using the client.

The content server may also initiate a content viewing (and/or listening) session 404 suitable for sampling of content data, examples of which have been described above. If the content session requested is not of a nature appropriate for sampling, sampling may be delayed until a suitable content session is initiated. A content serving process may alert a sampling module when a suitable content session is in progress, and pass the user identifier to the sampling module.

A sampling module, routine or application operating on or in cooperation with the content server may extract samples 406 as described herein. Extraction may be accomplished at any suitable point between creation or retrieval of content from storage and receipt of content by the client. For example, the content server may transmit content to a separate sampling server, which may sample the content and relay to the client destination. In the alternative, a client-side application may perform the sampling and transmit samples to a sample processing server for storage. Of course, the content server may itself perform the sampling, and various other arrangements for sampling may also be suitable. The sampling process may be operated independently of the content-providing process, whether at on the same or on different machines.

The sampling application or module may also time and date stamp each sample 408, and tag with a user identifier as previously described. Chronological and user ID tagging may be performed at any suitable point in the system architecture. Suitability testing and filtering may also be performed prior to storage of samples for use in verification.

Maintaining sampled images for use in verification 410 may be performed by any suitable process. This may be performed by hardware and/or software separate from the sampling module. For example, a database application and file server may be used to maintain samples in computer memory, for later use in a verification function. Maintenance may also include purging expired samples from system memory, and storage of new samples. Maintenance may also include responding to external queries for sample sets for use in verification testing. Such queries may specify a user ID and optionally other parameters, such as desired confidence level. An intermediate verification function may response to such general queries to identify specific user and decoy samples needed.

Figure 5:
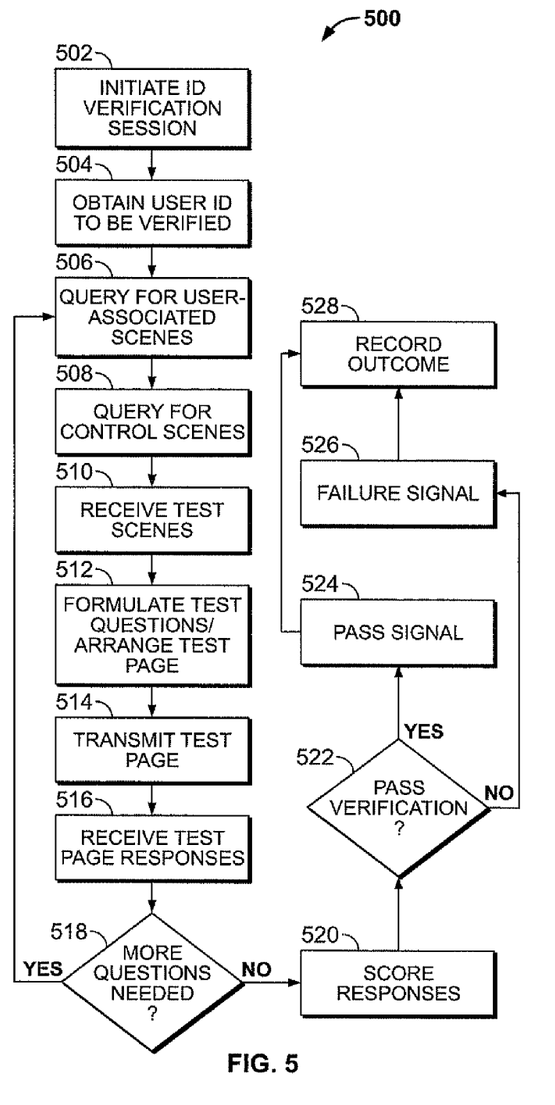
FIG. 5 is a flow chart showing elements of an authentication process using shared secret data that are generated and maintained using the novel methods and machines disclosed herein.

FIG. 5 shows exemplary steps of a method 500 for operating a verification function using digital sampling data collected by a sampling function in a user ID verification session. A verification session may be initialized 502 on request from a transacting node, for example, a merchant server requesting verification of identity for a person in a prospective transaction. A verification server may be configured as a general purpose service for all authorized requests. Once a request for verification is received by the verification server and authenticated, the verification server initiates a computing session having a user identification value as input and a pass/fail signal as output. In the alternative, or in addition, other session outputs may include a verification test score or a confidence interval for the pass/fail or other score.

Therefore after the request is authenticated the verification server may obtain the user ID to be verified 504. User ID's may comprise any code, or combination of coded information, used to identify an individual person, including but not limited to name, address, social security number, driver's license, and so forth. Such identifiers may need to be correlated to a unique user identifier used to tag sampled user data in the sample database. A relational database may be used to perform such correlations in response to general verification requests. For example, a transacting server may request ID verification for "John Q. Public" residing at "1 Pennsylvania Avenue, Washington D.C." In response to this request, a verification server may query the ID database and find a particular unique identifier associated with that name and address. The unique identifier may be used to obtain sample data for verification testing from the sample database. Conversely, if no unique identifier is found for the particular name and address, the verification server may require additional identification data from the transacting server, or provide an indication that verification data is not available for the requested person.

Once a unique identifier is obtained, the verification server may query the sample database 506 to obtain information concerning available data samples and types. As described above, samples may be classified into different types, for example, be assigned different useful life spans, and be associated with various different metadata, for example, date stamps and time stamps. Other sample characteristics that may be used for selection may include, for example, image type, image size, file format, and so forth. Based on the information concerning available samples, the verification server may execute a selection algorithm to select appropriate test samples from the set of available samples. For example, the verification server may use a random or quasi-random number generator to select all samples from a single set of available samples. In the alternative, the server may group samples into subsets according to one or more classification criteria (for example, sample age or file type), and use a quasi-random number generator to select samples from each subset. Other selection algorithms may also be used to select different sample sets in response to verification requests for one or more user identifiers.

The verification may also query the sample database 508 to obtain control or "decoy" samples for use in verification testing, using a selection algorithm designed to select decoy samples well-matched to the user samples, for example, samples of the same or similar type. Decoy samples may be selected from all available samples, or from some subset of available samples, again using random or quasi-random sampling. To improve the robustness of verification testing, it may be advantageous to select decoy samples using demographic data to select samples obtained from users having demographic profiles that match or are similar to the demographic profile of the user to be tested. For example, if the verification server accesses demographic data indicating that the user whose identity is to be verified is a male, English-speaking professional between the ages of 40 and 50 residing in New York, the server may select decoy samples collected for other users having the same or a similar profile. This may prevent the decoy samples from being more easily guessed by anyone who knows or correctly guesses the demographic profile of the tested user.

Once the user-associated samples have been thus identified, they may be requested and received from data storage 510. In the alternative, or in addition, hyperlinks to each of the samples may be generated for arranging in test document, for example, and XML or HTML page. The verification server may formulate test questions 512 based on sample metadata and verification requirements in parallel with obtaining test and decoy samples 506, 508. Samples and questions may be arranged in the test page for logical presentation to an end user, for example as shown in FIG. 3. The technology is not limited to use of web pages for verification testing. Other methods may also be suitable, for example testing via a Flash plug-in or proprietary media player. The verification server may record correct answers to the verification test in a local file for later use in scoring test answers.

One the test page or other test document is prepared, it may be transmitted 514 directly to the client operated by the user whose identity is to be tested. In the alternative, the test page may be transmitted to the test requesting server, which may forward the test to the end user. To prevent loss of confidentiality and degradation of sample usefulness, however, it may be advantageous for the verification server to transmit the test to the client for the user taking the test only. In addition, sample data may be retained in a secure database and not transmitted with the page, and links to it may be destroyed after a test is completed, to prevent the user or other users from studying verification tests or otherwise using tests improperly. In addition, or in the alternative, testing may be conducted with the client via a secure encrypted channel. In general, it may be advantageous for the test page to be configured such that it cannot be stored or cached at the client for inspection after the test is completed. Various methods as known in the art may be used to accomplish this result.

Once the test page or other testing file has been transmitted to the client, the verification server may receive test results 516 back from the client. For example, responses may be collected by objects in an HTML form, and transmitted back to the verification server, preferably in encrypted format, when the user activates a "Done" or "Send" form on the test page. Optionally, the test page may include an object for requesting a second test page, in case the user is not able to confidently remember whether or not she has previously experienced visual or other output from a particular sample. If more questions are needed for any reason 518, additional test pages may be generated and sent as previously described. If testing is complete 518, reponses may be scored 520 at the verification server using a stored answer file or other data. If all or sufficient answers are correct, the verification may score the result as a pass; if not, the result may be scored as a fail. Less preferably, a numeric score, such as percent of correct answers, may be generated. If scoring indicates a pass 522, data may be stored and/or transmitted to the server that requested verification 524, indicating that the identity of the user has been verified. If scoring indicates a failure 522, data may be stored and/or transmitted to the server that requested verification 526, indicating that the identity of the user has not been verified. Pass/fail and other scoring results may be recorded by the verification server for future reference. For example, if multiple consecutive failures are records, this may indicate an attempt at identity theft, causing the verification server to suspend verification testing for the affected user ID for a period of time.

Either or both methods 400 and 500, or portions thereof, may be coded as machine readable instructions for performance by one or more programmable computers, and recorded on a computer-readable media. These methods merely exemplify methods for extracting sample data and for providing identity verification via virtual scene selection. The present technology is not limited by these examples. Shared secret data collected using the disclosed methods or systems may be applied in any suitable knowledge-based authentication process operating in any suitable device capable of controlling access to a resource and receiving the shared secret data from sources as described herein.

The foregoing systems and methods may be implemented in contexts using online digital cameras to gather shared secret data. For example, a client device may comprise an automated teller machine (ATM) equipped with a digital security camera. The ATM may collect images of bank patrons as they use the ATM, using the security camera. A system computer may process the images thus obtained to extract selected portions, for example, a portion showing only an image of a piece of clothing, jewelry, or accessory worn by the bank patron. In a subsequent authentication session, a system computer may present the processed image portion collected from the security camera in an array (e.g., a decision matrix) with similar images as an identity challenge. For example, the system computer may generate and transmit output rendered as a display including the shared secret and decoy images, and text reading "identify which of the five pictured shirts you have worn in the last week," wherein the shared secret image is the shirt captured by the security camera and the decoy images are images of other shirts.

Similarly, many client devices include built-in or attached digital cameras, and these may be used to collect images of the user or local physical environment for later use in authentication testing. For example, in response to, or as part of, initiating a client connection to a website, a system computer may cause a client to photograph and upload a digital image using the client through which the connection is made. In a subsequent authentication session, the uploaded image may be presented with similar images as part of a challenge matrix. For example, a system computer may generate and cause a client device to output a challenge question such as "which wall paper matches the pattern in a room you were in when you last connected to our website," while presenting images of various wall colors and/or patterns. In addition, authentication systems may similarly capture and upload facial images for use in challenge matrices; such images, however are less useful in that the challenge question can easily be passed by anyone familiar with the appearance of the person assigned to a particular account. It should be apparent than facial images and the like gathered through client devices can also be used as biometric data in an automated biometric authentication system.

Having thus described a preferred embodiment of generating, maintaining and using shared secret data in knowledge-based authentication using sensible output recognition, it should be apparent to those skilled in the art that certain advantages of the within system and method have been achieved. It should also be appreciated that various modifications, adaptations, and alternative embodiments thereof may be made without departing from the scope and spirit of the present technology. The following claims define the scope of what is claimed.

The invention claimed is:

1. A method comprising:
sampling digital data according to a sampling function operating on a computer from a data stream used for generating sensible output during a first session between at least two network nodes initiated under a defined user account, wherein the first session is conducted for a primary purpose other than image recognition training;
storing the sampled digital data on a computer-readable medium in association with an identifier for the user account under which the first session is initiated;
transmitting the sampled digital data and decoy digital data configured for generating discrete sensible outputs to a client for use in an authentication session for a subsequent session under the user account;
authenticating access for the subsequent session in response to receiving input from the client indicating selection of sensible output generated from the sampled digital data from a challenge matrix comprising the sensible output generated from the sampled digital data and the decoy digital data.

2. The method of claim 1, wherein the discrete sensible outputs transmitted to the client comprise visible outputs.

3. The method of claim 1, wherein the discrete sensible outputs transmitted to the client comprise audible outputs.

4. The method of claim 1, further comprising monitoring parameters of the first session using the sampling function to identify suitable data for sampling.

5. The method of claim 4, wherein the parameters characterize a quantity of client input data received during output of each of the sampled digital data.

6. The method of claim 4, wherein the parameters characterize duration of output for each of the sampled digital data.

7. The method of claim 4, wherein the parameters include a time at which each of the sampled digital data is output from a client node.

8. The method of claim 4, further comprising storing parameter data from monitoring the parameters in association with the sampled digital data.

9. The method of claim 8, further comprising selecting the sampled digital data transmitted for use in the authentication session from a larger database of digital data samples, using the parameter data.

10. The method of claim 1, further comprising processing the sampled digital data to expunge data indicative of the user account.

11. The method of claim 10, wherein the processing comprises blurring textual data in the sampled digital data.

12. The method of claim 1, further comprising generating the decoy digital data to produce discrete sensible output resembling the sensible output sampled by the digital data.

13. The method of claim 1, further comprising generating the challenge matrix comprising multiple-choice questions enabling selection of the sensible output generated from the sampled digital data and sensible output generated from the decoy digital data.

14. The method of claim 1, wherein the first session is a secure session.

15. The method of claim 1, further comprising obtaining a portion of the sampled digital data from a digital camera operated under the control of one of the at least two network nodes during the first session.

16. An apparatus comprising processor operating instructions, configured for causing a computer to:
sample a data stream for independently generating visible image output during a first session with a client, to produce data sampled according to a sampling function;
store the sampled data in a database in association with an identifier for an account under which the first session is operated;
transmit at least selected ones of the sampled data and decoy data configured for generating visible image outputs to a client, for use in a challenge matrix used to secure access to a subsequent session initiated under the account identifier; and
permit access for the subsequent session in response to receiving input indicating successful discrimination between the sensible output generated from the sampled data and sensible output generated from the decoy data in the challenge matrix.

17. The apparatus of claim 16, the instructions further configured for causing the computer to monitor parameters of the first session indicative of likelihood that the particular image output is receiving user attention at the client node.

18. The apparatus of claim 17, the instructions further configured for causing the computer to store parameter data from monitoring the parameters in association with the sampled data.

19. The apparatus of claim 17, the instructions further configured for causing the computer to select at least a selected one of the sampled data using the parameter data to increase likelihood that image output during presentation of the challenge matrix will be remembered by a client-side participant in the first session.

20. The apparatus of claim 16, the instructions further configured for causing the computer to identify and expunge data indicative of the account from the sampled data.

21. The apparatus of claim 16, the instructions further configured for causing the computer to generate reduced-size image facsimiles from the sampled data and decoy data for presentation in the challenge matrix.

22. A system, comprising:
hosting means for hosting a secure online process in which images are output at a client device in response to data from the hosting means;
sampling means for sampling the data from the hosting means independently of the secure online process to generate stored sample data sampled according to a sampling function and configured for replicating images output during the secure online process; and
testing means for presenting images generated from the stored sample data with decoy images to authenticate a client initiating a subsequent process.

23. The system of claim 22, further comprising image processing means for removing indications of a user account from the stored sample data.

24. A method comprising:
sampling at least one digital data sample by operating a digital camera under the control of a computer during a first session between the computer and a host node initiated under a defined user account;
storing the sampled digital data on a computer-readable medium in association with an identifier for the user account under which the first session is initiated;

transmitting the sampled digital data and decoy digital data configured for generating discrete images to a client for use in an authentication session for a subsequent session initiated at a client under the user account; and authenticating access for the subsequent session in response to receiving input from the client indicating selection of an image generated from the sampled digital data sample from a challenge matrix comprising the image generated from the sampled digital data sample and decoy images generated from the decoy digital data.

* * * * *